Jan. 8, 1935. V. C. BENJAMIN 1,987,175
APPARATUS FOR CLAY TREATING OILS
Filed July 26, 1932
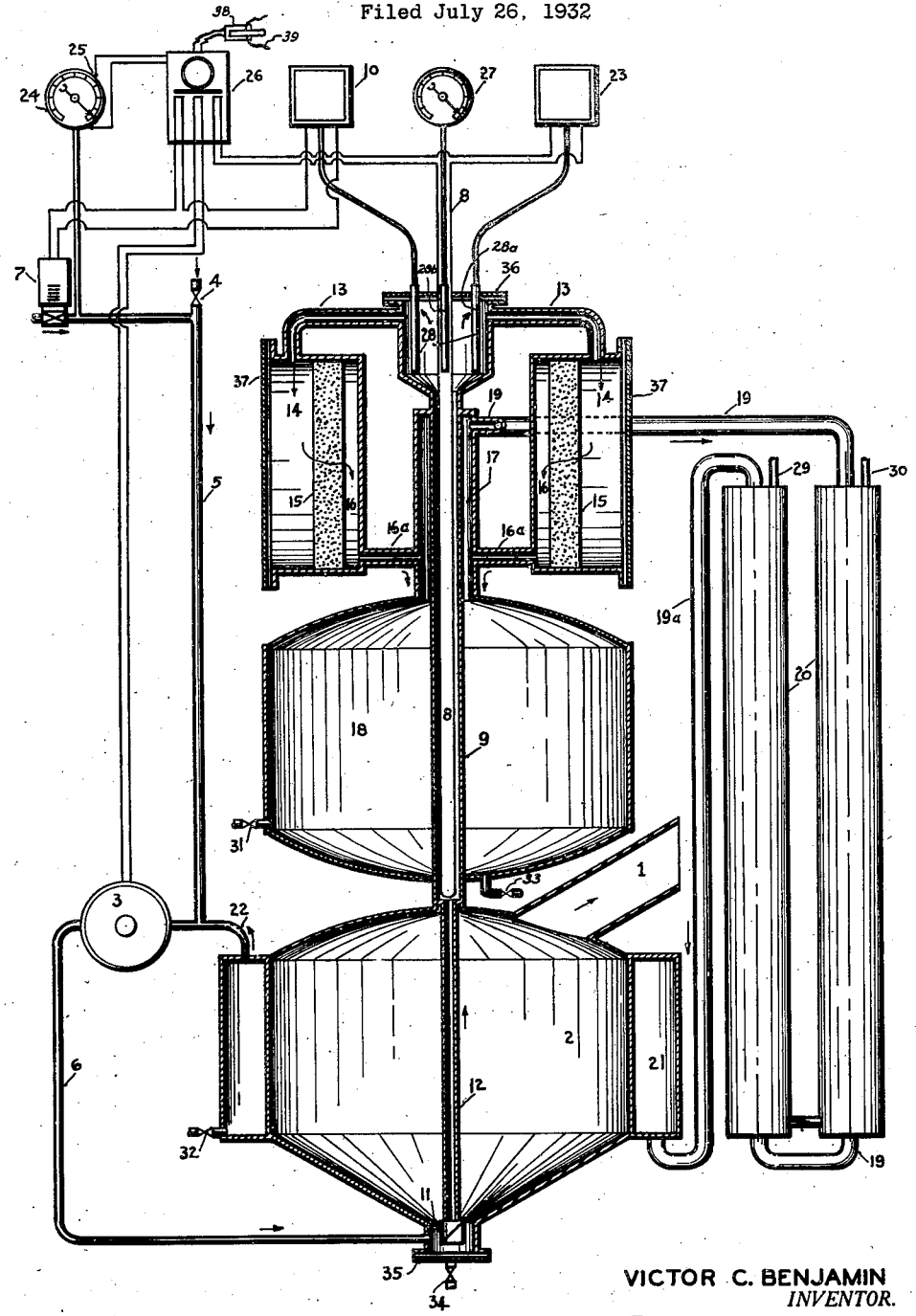
VICTOR C. BENJAMIN
INVENTOR.
BY *Paul W. Brugman*
ATTORNEY.

Patented Jan. 8, 1935

1,987,175

UNITED STATES PATENT OFFICE 1,987,175

APPARATUS FOR CLAY-TREATING OILS

Victor C. Benjamin, Los Angeles, Calif.

Application July 26, 1932, Serial No. 624,812

2 Claims. (Cl. 196—16)

The object of my invention is to provide a compact and efficient apparatus for treating relatively small quantities of lubricating oil (more specifically, used or "crank-case" oil) with decolorizing clay at a sufficiently elevated temperature to obtain substantially the full efficiency of the clay, and simultaneously to drive off and separately condense and collect the vapors of gasoline or of other volatile elements which may be present as a contamination in the raw material.

The objects and advantages of my invention will be fully evident on inspection of the attached drawing which shows, in section and internal and external elevation, an exemplification of my improved apparatus. The construction and operation of this apparatus are described as follows, with reference to the figure.

1 is a funnel or nozzle communicating with a tank 2 adapted to receive a supply of the raw oil to be treated. 3 is an exhaust or vacuum pump, preferably of the rotary type, driven by an electric motor not shown. 4 is a hand-operated air or vacuum breaking valve and 7 a solenoid operating a similar valve, both of these valves acting to admit air into a pipe 5 communicating with the suction of pump 3. 6 is a pipe affording communication between the discharge side of the pump and the preferably conical bottom of the raw oil tank 2.

8 is an electric heating element contained within a tube 9 from which an extension 12 is directed to the bottom of tank 2, terminating in a check valve 11. 10 is a thermostat arranged to control the solenoid valve 7.

13—13 are pipes communicating with the enlarged upper end of tube 9 and with the filter chambers 14—14. Within these chambers are placed the filtering elements 15—15, which may be the conventional perforated metal plate covered with a fine mesh wire gauze or a layer of comminuted mineral matter such as sand supported by a perforated plate and retained between stiff screens. I prefer to use the porous plates disclosed and claimed in my copending applications Serial Nos. 540,011 and 610,500 referring to a filtering material and a method of using the same.

16—16 are chambers for the reception of filtered oil, defined by the filtering elements 15—15, and 16a—16a are pipes affording communication between these chambers and the vertical tubular chamber 17 which communicates with a tank 18 adapted to receive the treated and filtered oil. It will be noted that tank 18 does not communicate in any manner with tank 2.

19 is a pipe acting as a condenser for vapors which are withdrawn from the upper part of the chamber 17, this pipe being surrounded by water jackets 20, which are supplied with water from any convenient source to a pipe 29, the heated water overflowing through a pipe 30. A pipe 19a conducts the condensate to a tank 21 which is arranged to surround a raw oil tank 2 but which does not communicate therewith in any manner. From the upper part of this tank a pipe 22 leads to the suction side of pump 3.

23 is a thermostat arranged to automatically control the supply of electric current to the heating element 8, according to the temperature of the oil surrounding the bulb 28a of this thermostat.

24 is a vacuum gauge communicating with the pipe 5 and provided with a "button" or electrical contacting point 25 which is adjustable around the periphery of the gauge. This button and the indicating needle of the gauge are so arranged that as the needle retracts under reduced vacuum, an electrical connection is established through the needle and the button, this electrical connection de-energizing the mechanism of an interlocking magnetic switch arranged to break the flow of electrical energy through the main lead and to cause the entire apparatus to cease to function.

An ordinary thermometer 28 having a bulb 28b immersed in the oil in the enlarged upper end of tube 9 is used as an indication of temperatures and to facilitate proper adjustment of thermostats 10 and 23. The treated oil tank 18 is provided with a clean oil draw-off valve 31 and with a drainage valve 33 for removing any water or sediment which may collect in this tank below the clean oil level. The raw oil tank 2 is provided with a similar drainage valve 34 which is preferably placed in a removable flange 35, this flange giving access to the check valve 11. The enlarged upper end of the tube 9 is provided with a removable flange 36 for withdrawing the thermometer and thermostat bulbs, and the filter chambers 14 are provided with removable flanges 37—37 for withdrawing the cake of filtered clay at the end of the filtration.

The above described apparatus is started and operated as follows. A mixture of raw oil and clay, previously formed in any suitable manner, is introduced through funnel 1 into raw oil tank 2. Pump 3 is started by closing the main hand switch 38, the air intake valve 4 being open. Air is thus drawn into the pump through pipe 5 and discharged through pipe 6 into the bottom of tank 2, thus agitating the oil and clay mixture. This air is discharged from the tank through funnel 1 or any other vent which may be provided.

After thorough agitation for a few minutes valve 4 is partially closed, to a predetermined closure point or to produce a desired vacuum on the gauge 24. For this purpose a spring-weighted vacuum relief valve may be provided at any point along the line of pipe 5. The vacuum by which filtration and partial distillation of the oil is produced is not created until the thermostatically controlled valve 7 closes itself as the temperature of the oil rises in the next step.

When pump 3 is started by manual closing of the main switch 38, an electrical heating element 8 is automatically put into operation by the closing of the interlocking magnetic switch 26. The temperature of the air in heater tube 9 is thus elevated and at a predetermined point thermostat 10 actuates solenoid valve 7, closing it against air intake and thus causing pump 3 to create a degree of vacuum in the system which is determined and limited by the setting of manual valve 4 or by the adjustment of a corresponding vacuum control valve already referred to.

The vacuum thus created causes the oil and clay mixture in tank 2 (this mixture being always in slight agitation by reason of the exhaust from pump 3 entering the bottom of tank 2 through pipe 6) to enter through check valve 11 into line 12 from which it passes through heater tube 9 around the heater 8 and through pipes 13 into the filter 14.

Passing through the filtering medium 15, the hot oil enters the chamber 16 where it is exposed to the maximum reduction of pressure while spread out in the thin film which constantly drains down the outlet side of the filtering medium. Due to its high temperature and the relatively high vacuum, the volatile elements of the oil are converted into vapors which pass, together with the residual oil, through pipe 16a into the tubular chamber 17. In this chamber the vapors and oil separate, the filtered and devaporized oil flowing downwardly into tank 18 while the vapors pass through pipe 19 into the condenser 20. From this condenser the condensate flows through pipe 19a into the condensate receiving tank 21. This tank as described is connected at its upper portion into the suction of pump 3.

It will be obvious that in this system the transference and filtration of the oil are effected solely by a reduction in pressure on the outlet side and that the required vacuum is thus maintained throughout the entire system except as it may be interrupted by the functioning of valve 7.

To automatically control the tuning of the apparatus when starting it up from a cold state, the solenoid valve 7 is regulated by thermostat 10. The valve 7 is normally closed, thus shutting off flow of free air through pipe 5 to pump 3; the thermostat 10 is also normally closed at temperatures below the predetermined operating temperature, hence when main line electrical switch 38 is closed, the thermostat 10 immediately energizes valve 7, causing it to open and thus preventing any vacuum in the system. As the oil in tube 9 rises to the predetermined temperature selected as suitable for filtration, the thermostat 10 breaks contact with valve 7, allowing it to close, pump 3 creates vacuum in the system, cold oil from tank 2 is drawn into heater tube 9, lowering the temperature therein, thermostat 10 again opens valve 7, which allows free air to enter pump 3 through pipe 5 and the vacuum is thus again broken. This described cycle of operation (thermostatic opening and closing of valve 7) will continue for such time as may be necessary to thoroughly heat the apparatus to that temperature where cold oil entering through line 12 will no longer cause a sufficient lowering of temperature in heater tube 9 to actuate thermostat 10.

I claim as my invention:

1. Apparatus for clay-treating lubricating oils and removing volatile elements therefrom, comprising: a supply tank freely communicating with the atmosphere; a filtering element; a conduit affording communication between said supply tank and the intake side of said filtering element; an electrical heating element in said conduit; a separating chamber communicating with the outlet side of said filter; a closed heavy oil receiving tank communicating with said separating chamber; a condenser communicating with said separating chamber; a closed condensate receiving tank communicating with said condenser; a vacuum pump communicating with said condensate receiving tank; an air inlet conduit communicating with the suction side of said pump; a valve in said air inlet conduit; a solenoid adapted to open and close said valve, and a thermostat adapted to control said solenoid to close said valve when the temperature in the first-named conduit surrounding the bulb of said thermostat exceeds a predetermined maximum and to open said valve when said temperature falls below a predetermined minimum.

2. Apparatus for clay-treating lubricating oils and removing volatile elements therefrom, comprising: a supply tank freely communicating with the atmosphere; a filtering element; a conduit between said element and said tank and means for heating said conduit; means for separately withdrawing filtered oil and vapors from the outlet side of said filter; means for maintaining a partial vacuum in said withdrawal means, to actuate said oil into and through said heated conduit and said filter, and means responsive to the temperature in said heated conduit for releasing said vacuum when said temperature falls below a predetermined minimum and for reestablishing said vacuum when said temperature exceeds a predetermined maximum.

VICTOR C. BENJAMIN.